(12) United States Patent
Walker

(10) Patent No.: US 7,717,556 B1
(45) Date of Patent: May 18, 2010

(54) VISUAL ENHANCEMENT LENS AND ASSOCIATED METHODS

(76) Inventor: Jon Scott Walker, 2902 Madrid St., Jacksonville Beach, FL (US) 32250

( * ) Notice: Subject to any disclaimer, the term of this patent is extended or adjusted under 35 U.S.C. 154(b) by 162 days.

(21) Appl. No.: 11/773,682

(22) Filed: Jul. 5, 2007

Related U.S. Application Data

(60) Provisional application No. 60/806,561, filed on Jul. 5, 2006.

(51) Int. Cl.
*G02C 7/04* (2006.01)

(52) U.S. Cl. .................. 351/161; 351/160 R; 351/164; 351/159

(58) Field of Classification Search ............. 351/160 R, 351/161, 164; 623/6.11, 6.24
See application file for complete search history.

(56) References Cited

U.S. PATENT DOCUMENTS

| | | | |
|---|---|---|---|
| 3,474,255 A * | 10/1969 | White | 250/225 |
| 3,970,362 A | 7/1976 | Laliberte | |
| 4,981,342 A | 1/1991 | Fiala | |
| 5,044,743 A * | 9/1991 | Ting | 623/6.35 |
| 5,120,120 A | 6/1992 | Cohen | |
| 5,225,858 A * | 7/1993 | Portney | 351/161 |
| 5,408,281 A | 4/1995 | Zhang | |
| 5,929,969 A | 7/1999 | Roffman | |
| 6,250,759 B1 | 6/2001 | Kerns et al. | |
| 6,426,838 B1 * | 7/2002 | Rudeen | 359/487 |
| 6,874,888 B1 * | 4/2005 | Dudai | 351/162 |
| 7,002,744 B2 | 2/2006 | Evans et al. | |
| 7,093,938 B2 | 8/2006 | Morris et al. | |
| 2003/0147047 A1 | 8/2003 | Renard | |
| 2006/0206206 A1 | 9/2006 | Peyman et al. | |

\* cited by examiner

*Primary Examiner*—Ricky L Mack
*Assistant Examiner*—James R Greece
(74) *Attorney, Agent, or Firm*—Allen, Dyer, Doppelt, Milbrath & Gilchrist, P.A.

(57) ABSTRACT

A vision enhancement device is provided that is made of a lens material that has a first polarization orientation in a central portion and a second polarization orientation substantially normal to the first polarization in an annular portion surrounding the central portion. The central portion has a prescription for one of near vision and distance vision. The annular portion has a prescription for the other of near vision and distance vision.

15 Claims, 1 Drawing Sheet

VISUAL ENHANCEMENT LENS AND ASSOCIATED METHODS

CROSS-REFERENCE TO RELATED APPLICATION

This application claims priority to Provisional Application Ser. No. 60/806,561, filed Jul. 5, 2006.

BACKGROUND OF THE INVENTION

1. Field of the Invention

The present invention relates to vision enhancement devices and methods for improving visual acuity, and, more particularly, to such vision enhancement devices and methods that provide bifocal and/or multifocal visual correction, and, most particularly, to vision enhancement devices as contact lenses and intraocular and other types of lens implants.

2. Description of Related Art

Bifocal contact lenses are known in the art for correcting distance (myopia, hyperopia, and astigmatism) and near (presbyopia) vision. Three typical designs include aspheric, in which near and distance prescriptions are near the pupil; concentric, in which the near prescription is near the middle of the lens, and the distance prescription is on the outside, or vice versa; and translating, in which one prescription is in one part and the other correction is on another part of the lens. Distance or near vision is achieved by the appropriate portion of the lens overlapping the optical axis. In the concentric and aspheric designs, it is theorized that the overlapped images focused on the retina are differentiated by the wearer, although not all people can succeed in adapting to these designs.

It is also known to polarize contact lenses in order to reduce glare. In polarized lenses, light in one meridian is permitted to pass through while blocking light entering 90 degrees from the one meridian.

Further, intraocular lens implants and other types of implants such as intracorneal and intrastromal lens implants are known in the art for improving visual acuity.

It would be desirable to provide a vision enhancement device that diminishes and potentially eliminates overlapped images and blur circles to improve adaptability for a greater proportion of the population.

SUMMARY OF THE INVENTION

The present invention is directed to a vision enhancement device comprising a lens material. The device can comprise, for example, a contact lens, although this is not intended as a limitation, and other types of vision enhancement devices such as intraocular, intracorneal, and intrastromal lens implants are also contemplated by the invention. The lens material has a first polarization orientation in a central portion and a second polarization orientation substantially normal to the first polarization orientation in an annular portion surrounding the central portion. The central portion comprises a prescription for one of near vision and distance vision, and the annular portion comprises a prescription for the other of near vision and distance vision.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

DETAILED DESCRIPTION OF THE PREFERRED EMBODIMENTS

Figure 1:
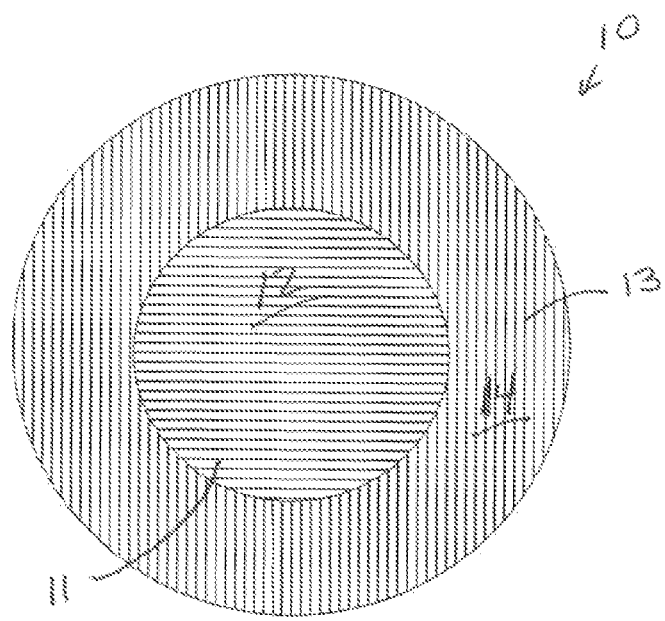
FIG. 1 is a schematic illustration of a first embodiment of a contact lens of the present invention.
Figure 2:
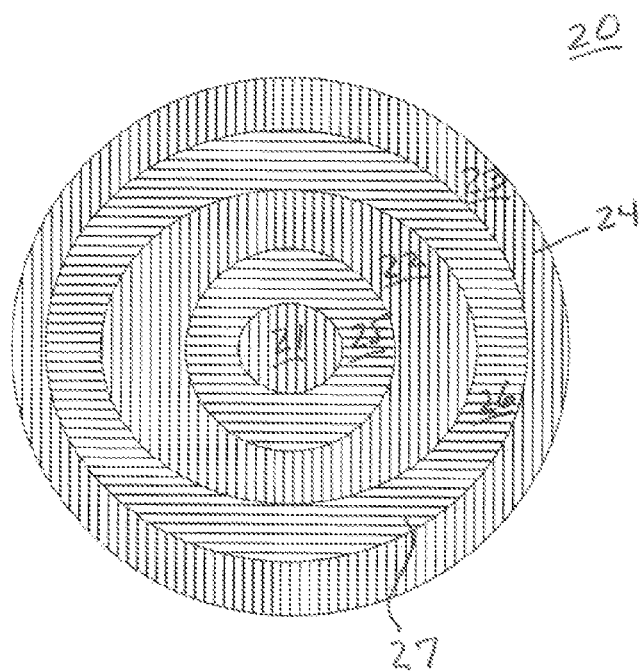
FIG. 2 is a schematic illustration of a second embodiment of a contact lens of the present invention.

A description of the preferred embodiments of the present invention will now be presented with reference to FIGS. 1 and 2.

A first embodiment of a contact lens 10 of the present invention comprises a lens material such as known in the art. The lens material has a first polarization orientation 11 in a central portion 12 and a second polarization orientation 13 substantially normal to the first polarization orientation 11 in an annular portion 14 surrounding the central portion 12. The first 11 and second 13 polarization orientations can comprise, for example 90- and 180-degree orientations. In an alternate embodiment, one or the other of the central 12 and annular 14 portions can be unpolarized.

The central portion 12 comprises a first prescription for one of near vision and distance vision; the annular portion 14 comprises a second prescription for the other of near vision and distance vision.

It is believed that the concentric ring pattern of alternating distance and near powers can allow distance images to pass through the lens 10 along, for example, the 180-degree meridian, but not the 90-degree meridian. The near images would then pass, for example, along the 90-degree meridian but not the 180-degree meridian. It is further believed that clear, non-overlapped images would result that would be easier to process by a greater portion of the population. In addition, binocularity and stereo acuity would be unaffected. The lens 10 also allows amblyopic patients an uncompromised bifocal contact lens option.

In a second embodiment of a contact lens 20 illustrated in FIG. 2, additional annuli are provided that alternate in polarization and prescription. In particular, the center 21, second 22, and fourth 23 rings are polarized in a first direction 24 and have a prescription for distance or near correction; the first 25 and third 26 rings are polarized in a second direction 27 that is preferably normal to the first direction 24 and have a prescription for near or distance correction, respectively.

It will be understood by one of skill in the art that other technologies besides polarization can be used, for example, but not intended to be limited to, diffraction gratings, prismatic, translation, or other wavelength-enhancement options. Further, additional, multi-focal distances may be accounted for, and could incorporate intraocular, intracorneal, or intrastromal implants designed to provide a multi-focal function. In a particular embodiment, the alignment can be 90 degrees apart in each eye; alignment with the other eye may not be critical for appropriate visual function.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

What is claimed is:

1. A vision enhancement device comprising a lens material having a first polarization orientation in a central portion and a second polarization orientation substantially normal to the first polarization orientation in an annular portion surrounding the central portion, the central portion comprising a prescription for one of near vision and distance vision, the annular portion comprising a prescription for the other of near vision and distance vision, the lens material consisting of a single lens with the annular portion comprising a first annular portion of the single lens and a second annular portion of the single lens surrounding the first annular portion, and a third annular portion of the single lens surrounding the second annular portion; the second annular portion having the central portion prescription and the first polarization; and wherein the third annular portion has the first annular portion prescription and the second polarization.

2. The vision enhancement device recited in claim 1, comprising one of a contact lens, an intraocular lens implant, an intracorneal lens implant, and an intrastromal lens implant.

3. The vision enhancement device recited in claim 1, wherein the first polarization orientation comprises one of a 90- and a 180-degree polarization, and the second polarization orientation comprises the other of a 90- and a 180-degree polarization.

4. A single vision enhancement lens having a first polarization orientation in one of a central portion and an annular portion surrounding the central portion, and having a second polarization in the other of the central portion and the annular portion, the central portion comprising a prescription for one of near vision and distance vision, the annular portion comprising a prescription for the other of near vision and distance vision.

5. The single lens recited in claim 4, comprising one of a contact lens, an intraocular lens implant, an intracorneal lens implant, and an intrastromal lens implant.

6. The single lens recited in claim 4, wherein:
the annular portion comprises a first annular portion;
the single lens further comprises a second annular portion surrounding the first annular portion, and a third annular portion surrounding the second annular portion;
the second annular portion has the central portion prescription and the first polarization; and
the third annular portion has the first annular portion prescription and the second polarization.

7. A method of making a vision enhancement device comprising the steps of:
introducing into a single lens a first polarization orientation in a central portion and a second polarization orientation substantially normal to the first polarization orientation in an annular portion surrounding the central portion;
creating in the central portion a prescription for one of near vision and distance vision; and
creating in the annular portion a prescription for the other of near vision and distance vision.

8. The method recited in claim 7, wherein the vision enhancement device comprises one of a contact lens, an intraocular lens implant, an intracorneal lens implant, and an intrastromal lens implant.

9. The method recited in claim 7, wherein the first polarization orientation comprises one of a 90- and a 180-degree polarization, and the second polarization orientation comprises the other of a 90- and a 180-degree polarization.

10. The method recited in claim 7, wherein
the annular portion comprises a first annular portion; and
the introducing step further comprises introducing into the lens material a second annular portion surrounding the first annular portion having the first polarization, and a third annular portion surrounding the second annular portion having the second polarization; and further comprising the steps of:
creating in the second annular portion the central portion prescription; and
creating in the third annular portion the first annular portion prescription.

11. A method for simultaneously enhancing both near vision and distance vision in a patient comprising the step of introducing into an eye of a patient a lens having a first polarization orientation in a central portion and a second polarization orientation substantially normal to the first polarization orientation in an annular portion surrounding the central portion, the central portion comprising a prescription for one of near vision and distance vision, the annular portion comprising a prescription for the other of near vision and distance vision.

12. The method recited in claim 11, wherein the enhancement device lens comprises one of a contact lens, an intraocular lens implant, an intracorneal lens implant, and an intrastromal lens implant.

13. The method recited in claim 11, wherein the first polarization orientation comprises one of a 90- and a 180-degree polarization, and the second polarization orientation comprises the other of a 90- and a 180-degree polarization.

14. The method recited in claim 11, wherein:
the annular portion comprises a first annular portion;
the lens further comprises a second annular portion surrounding the first annular portion, and a third annular portion surrounding the second annular portion;
the second annular portion has the central portion prescription and the first polarization: and
the third annular portion has the first annular portion prescription and the second polarization.

15. A device for simultaneously enhancing both near vision and distance vision in a patient comprising a unitary lens having a first polarization orientation in a central portion and a second polarization orientation substantially normal to the first polarization orientation in an annular portion surrounding the central portion, the central portion having a prescription for one of near vision and distance vision, with the annular portion having a prescription for the other of near vision and distance vision.

* * * * *